United States Patent [19]

Noto et al.

[11] Patent Number: 4,992,944
[45] Date of Patent: Feb. 12, 1991

[54] POWER STEERING CONTROL SYSTEM

[75] Inventors: Yasuo Noto, Tokyo; Noboru Sugiura, Mito; Hideyuki Ouchi, Yokohama, all of Japan

[73] Assignee: Hitachi, Ltd., Tokyo, Japan

[21] Appl. No.: 356,866

[22] Filed: May 25, 1989

Related U.S. Application Data

[63] Continuation-in-part of Ser. No. 8,263, Jan. 29, 1987, abandoned.

[30] Foreign Application Priority Data

Jan. 30, 1986 [JP] Japan ................................ 61-18589

[51] Int. Cl.⁵ ............................................... B62D 5/04
[52] U.S. Cl. ............................... 364/424.05; 180/79.1; 180/142
[58] Field of Search ............... 364/424.05; 74/388 PS; 180/79.1, 141, 142, 143

[56] References Cited

U.S. PATENT DOCUMENTS

| | | | |
|---|---|---|---|
| 4,657,103 | 4/1987 | Shimizu | 180/79.1 |
| 4,664,211 | 5/1987 | Oshita et al. | 180/79.1 |
| 4,715,461 | 12/1987 | Shimizu | 180/79.1 |
| 4,753,308 | 6/1988 | Noto et al. | 180/79.1 |
| 4,819,170 | 4/1989 | Shimizu | 180/79.1 |
| 4,834,203 | 5/1989 | Takahashi et al. | 180/79.1 |
| 4,842,088 | 6/1989 | Oshita et al. | 180/142 |
| 4,869,334 | 9/1989 | Marumoto et al. | 180/79.1 |

Primary Examiner—Gary Chin
Attorney, Agent, or Firm—Ladas & Parry

[57] ABSTRACT

An electrically-operated power steering control system is disclosed for an electrically-operated power steering apparatus in which a motor is controlled in accordance with a predetermined function of the steering power applied to a steering wheel and an auxiliary steering power is supplied by this motor. The motor is controlled on the basis of a conduction ratio which is modified depending on a comparison between a change of a detected torque signal of a torque sensor and the rate of change of the steering angle.

5 Claims, 10 Drawing Sheets

POWER STEERING CONTROL SYSTEM

This is a continuation-in-part of copending application(s) Ser. No. 07/008,263 filed on Jan. 29, 1987 now abandoned.

BACKGROUND OF THE INVENTION

The present invention relates to a power steering apparatus for automobiles or the like, and more particularly to an electrically-operated power steering control system having an improved steering feel.

Automobiles or the like, which are driven by a great variety of users, are often equipped with power steering regardless of the size of the automobiles, so as to keep drivers less tired and helping them to drive safely.

Most of the power steering apparatuses so far used are of a hydraulic type. In recent years, however, an electrically-operated power steering apparatus has been suggested for its versatility of control and high energy-saving effect.

In most of the electrically-operated power steering apparatuses, a motor is used as an electrically-operated actuator which requires a great operating power, and the final operating power for auxiliary or assisting steering is obtained by reducing the output of the actuator.

As a result, in conventional electrically-operated power steering apparatuses, the auxiliary steering power is supplied through a reduction mechanism by a motor driven at high speed.

On the other hand, the motor has an inertial resistance due to the mass of the armature (rotor), and the reduction mechanism, which includes a plurality of gear trains, causing a great mechanical resistance when the output shaft thereof is to be rotated. Unless the motor is driven, therefore, the auxiliary steering power fails to work, so that a great power is required to turn a steering wheel against the inertial resistance and the mechanical resistance mentioned above. The steering wheel movement thus becomes very heavy and its stability deteriorates, which combined with the great friction resistance occurring in the unloaded operation of the motor from the output side of the reduction mechanism causes a very undesirable feel to the steering when operating the steering wheel.

The undesirable feel to the steering that occurs from the inertia of the motor in operating the steering wheel may be considerably improved by giving a differential characteristic to the control apparatus of the motor as disclosed in JP-A-55-76760.

In this conventional method, however, not only is a differential circuit additionally necessary, but the addition of the newly added differential characteristic requires a new noise-proof consideration, thus often increasing the production cost. In addition, the deterioration of the steering feel caused by the friction resistance described above is not improved at all, thus making it impossible to expect a satisfactory improvement of the steering feel as a whole. The deterioration of the steering feel due to the friction resistance presents itself in the form of an extreme reduction or extinction of stability which should otherwise be maintained at steering angles other than zero (neutral positions).

When steering power is applied by the driver to the steering wheel, the motor gives an assisting steering power thereto. Since the motor has an inertia, however, the driver is required to assist the motor by applying the steering power to the steering wheel which is equal to the inertial energy of the motor proportional to the square of the motor speed in order to accelerate the motor. It is also necessary for the driver to stop the motor through the steering wheel when stopping the motor. Especially when the driven intends to turn the steering wheel quickly, the time required for the motor to reach a required speed provides a load which gives a shock to the driver's hands. The above-mentioned control circuit using the differentiation is for compensating for this load. This method, however, ignores the acceleration and deceleration energy required of the motor, and therefore has the disadvantage of the shortage of energy to be compensated by the steering speed.

In addition, the conventional control circuits, in which the steering power is controlled only from a torque sensor and the steering power fails to correspond smoothly with the assisting power, has the shortcoming of a very inferior feel to the steering.

SUMMARY OF THE INVENTION

Accordingly, an object of the present invention is to provide an electrically-operated power steering control apparatus in which the steering speed of the steering wheel has a satisfactory feel.

According to one aspect of the present invention, there is provided an electrically-operated power steering apparatus in which a motor is controlled in accordance with a predetermined function of the steering power applied to the steering wheel and the auxiliary or assisting steering power is given by this motor, the motor being controlled by a conduction ratio (duty cycle) which is modified in accordance with a comparison between a change of an output signal of torque sensor and the rate of change of the signal from a steering angle sensor.

According to another aspect of the invention, there is provided an electrically-operated power steering apparatus for controlling rotating power of a motor in accordance with a predetermined function of the steering power applied to a steering wheel thereby to apply an auxiliary steering power from the motor to the steering wheel, including a torque sensor for detecting through a steering shaft said steering power applied to said steering wheel as a torque signal;

a steering angle sensor for detecting a steering angle of a road wheel and for producing a signal indicative thereof;

processing means for effecting a comparison between a rate of change of the signal from said steering angle sensor and a change of the torque signal delivered from said torque sensor;

conduction ratio processing means for determining a conduction ratio based on at least a value obtained from the steering power delivered from said torque sensor;

means for determining a control mode for said motor based on the outputs from said conduction ratio processing means and said reduction processing means; and chopper means controlled in accordance with the determined control mode by said determining means thereby to control said motor, whereby said motor is controlled in accordance with the conduction ratio based on the comparison between the rate of change of the torque signal delivered from said torque sensor and the rate of change of signal from said steering angle sensor.

DESCRIPTION OF THE PREFERRED EMBODIMENTS

A power steering control system according to the present invention will be explained below in detail with reference to an embodiment shown in the accompanying drawings.

Figure 1:
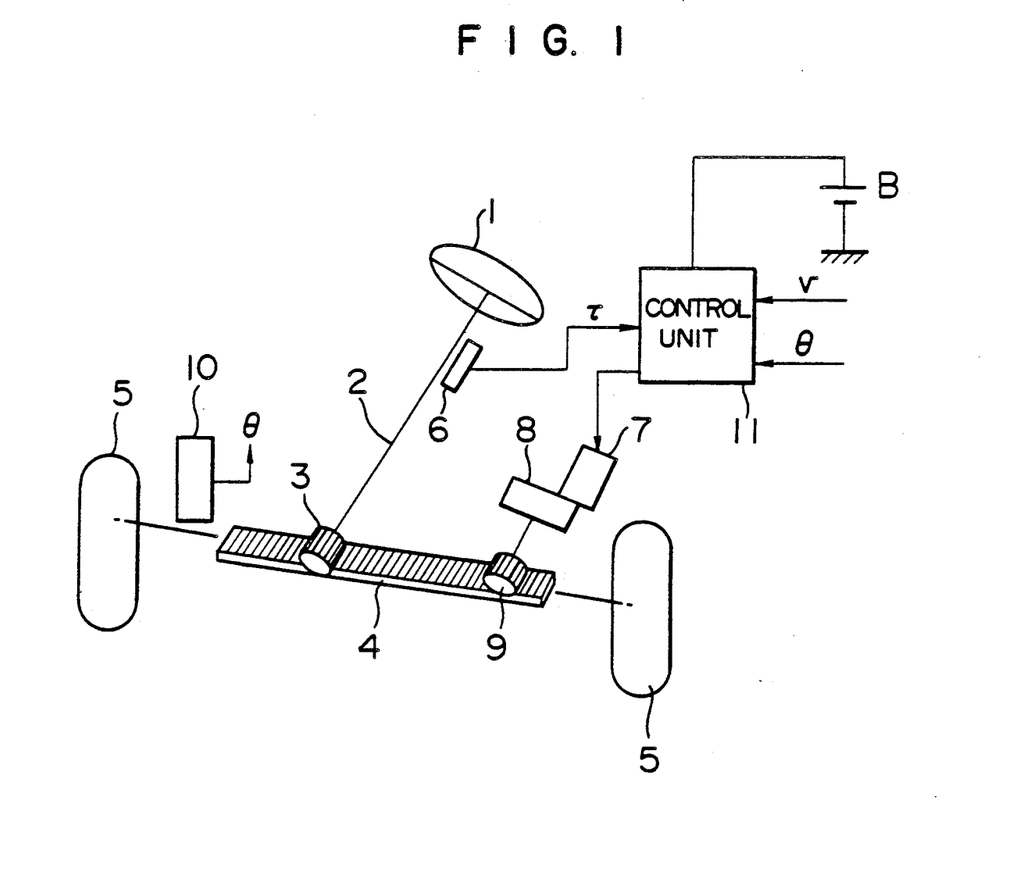
FIG. 1 is a diagram showing a system configuration of the power steering control system according to an embodiment of the present invention.

FIG. 1 shows an embodiment of the present invention as applied to an electrically-operated power steering system of an automobile. Reference numeral 1 designates a steering wheel, numeral 2 a steering wheel shaft, numeral 3 a pinion, numeral 4 a rack, numeral 5 a deflection tire (wheel), numeral 6 a torque sensor, numeral 7 a power-assisting motor, numeral 8 a reduction mechanism, numeral 9 a pinion, numeral 10 a steering sensor, and numeral 11 a control unit. Reference character B designates a power battery.

This embodiment is what is called the rack and pinion type, in which the steering power transmitted from the driver to the steering wheel 1 is further transmitted from the wheel shaft 2 through the pinion 3 to the rack 4 thereby to turn the tire 5 at a predetermined steering angle.

Figure 2:
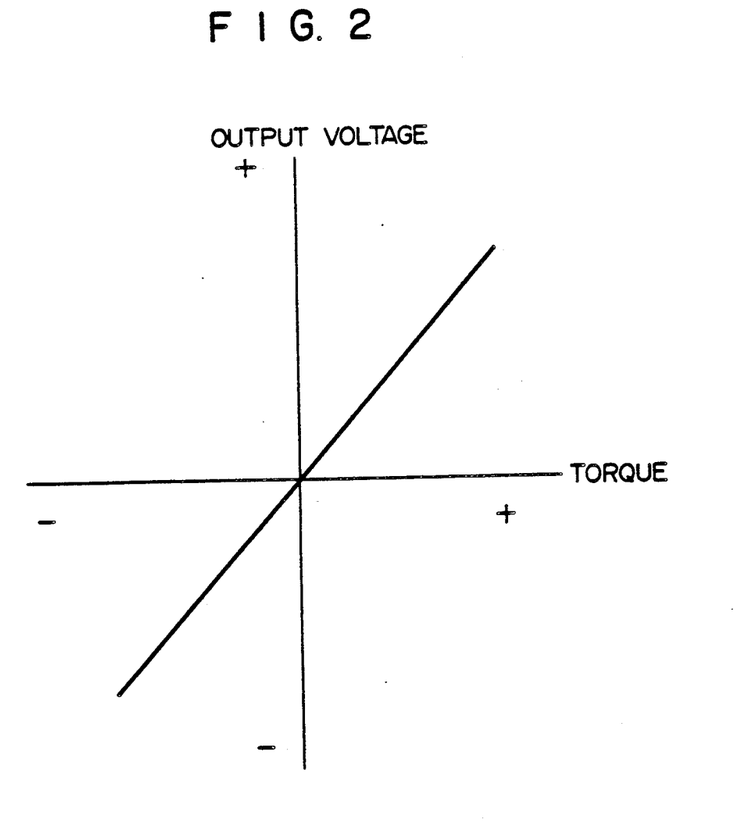
FIG. 2 shows characteristics of a torque sensor used according to the present invention.

When the steering wheel 1 is rotated by the driver, the torque sensor 6 detects the torque imparted from the steering wheel 1 to the pinion 3 through the steering wheel shaft 2 and generates a signal representing the magnitude of the torque. The torque sensor includes, for example, a sprain gauge or a torsional spring mechanism mounted on the shaft 2, and a variable resistor for detecting the amount of torsion thereof, which has a characteristic as shown in FIG. 2.

The motor 7 operates as an electrically-operated actuator for imparting the auxiliary steering power to the rack 4 through the pinion 9 and the reduction mechanism 8 having a gearing system or the like.

Figure 3:
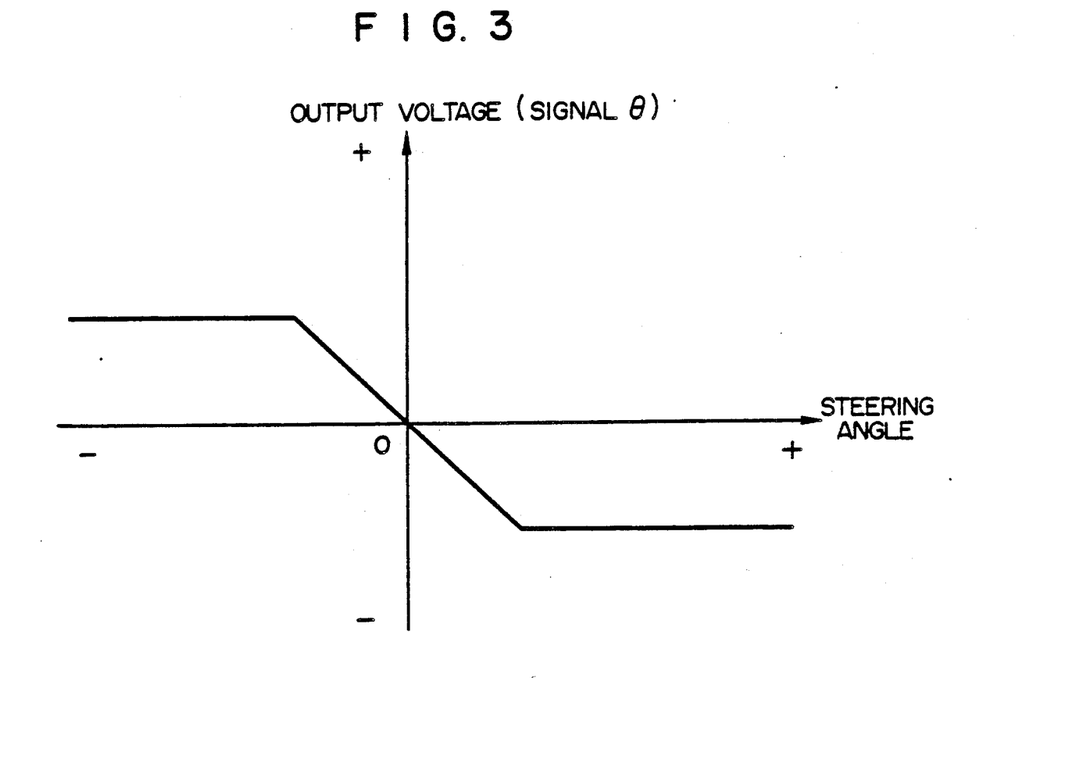
FIG. 3 shows characteristics of a steering angle sensor used in the invention.

The steering angle sensor 10 has the function of detecting the steering angle (deflection angle) of the tire 5 and generates a signal representing the steering angle in accordance with the characteristics shown in FIG. 3, with the steering angle of a straight-running car or the neutral position of the deflection angle of the tire 5 as zero. The steering angle sensor 10 includes a rotary encoder having a variable resistor for detecting the rotational angle of a member adapted to rotate with the deflection of the tire 5 and a linear encoder for detecting the motion of a straight-moving member.

Figure 4:
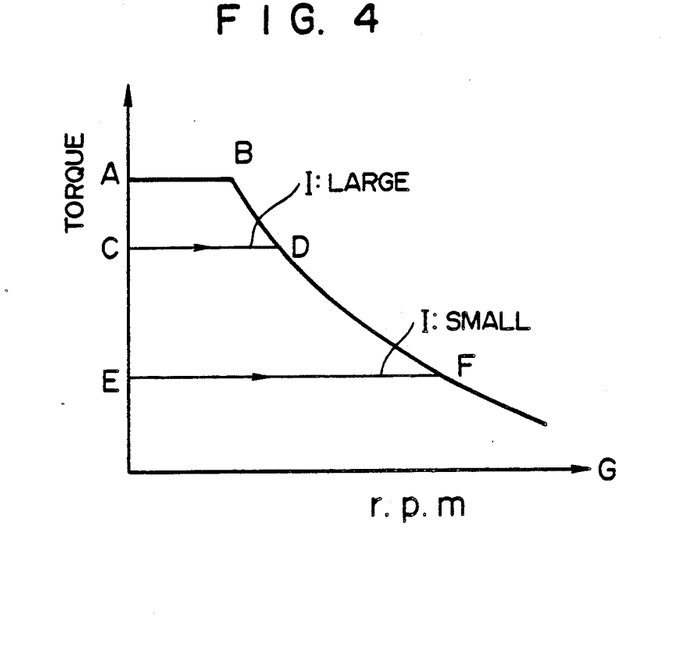
FIG. 4 shows the speed torque characteristic of a motor used in the present invention.

The motor 7 used with this power steering apparatus has a torque-speed characteristic as shown in FIG. 4. When the armature current I of the motor 7 is large, the torque characteristic undergoes a change from C to D to F to G in FIG. 4 against the motor speed. When the armature current I is small, by contrast, the torque characteristic changes from E to F to G against the motor speed.

Figure 5:
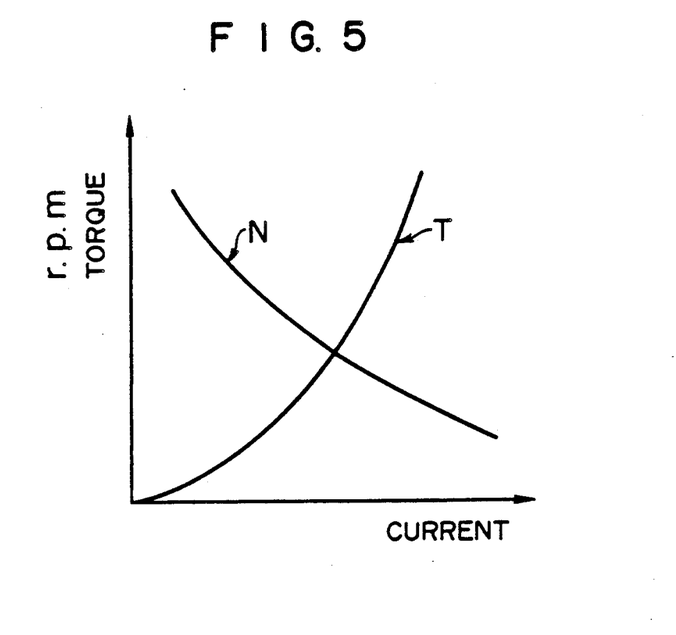
FIG. 5 shows characteristics of the armature current and speed/torque of the motor used in the present invention.

The characteristics of the armature current I, motor speed and torque of the motor 7 are shown in FIG. 5.

Figure 6:
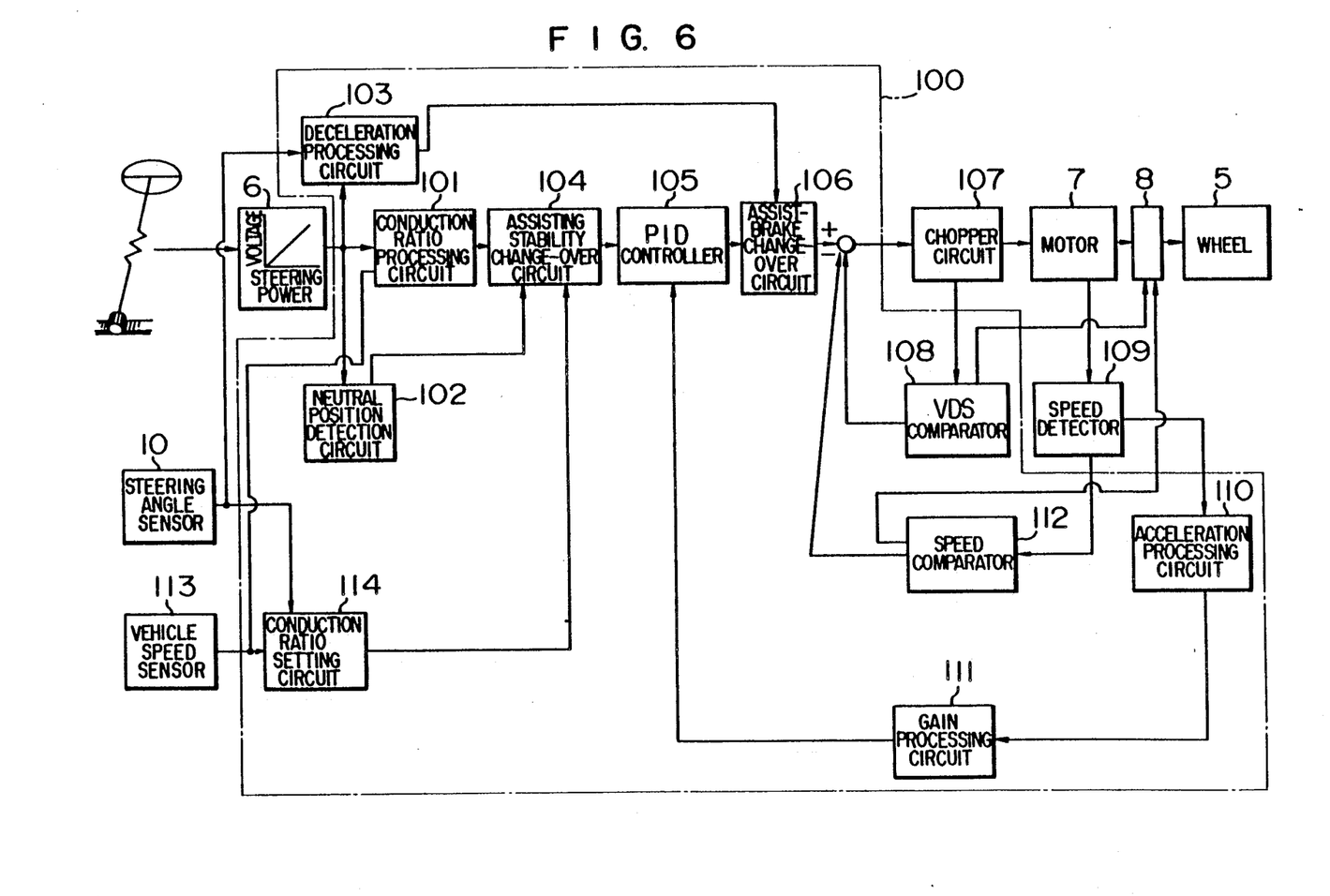
FIG. 6 is a block diagram showing an embodiment of the present invention.

An example of the control unit 11 is shown in FIG. 6.

Figure 7:
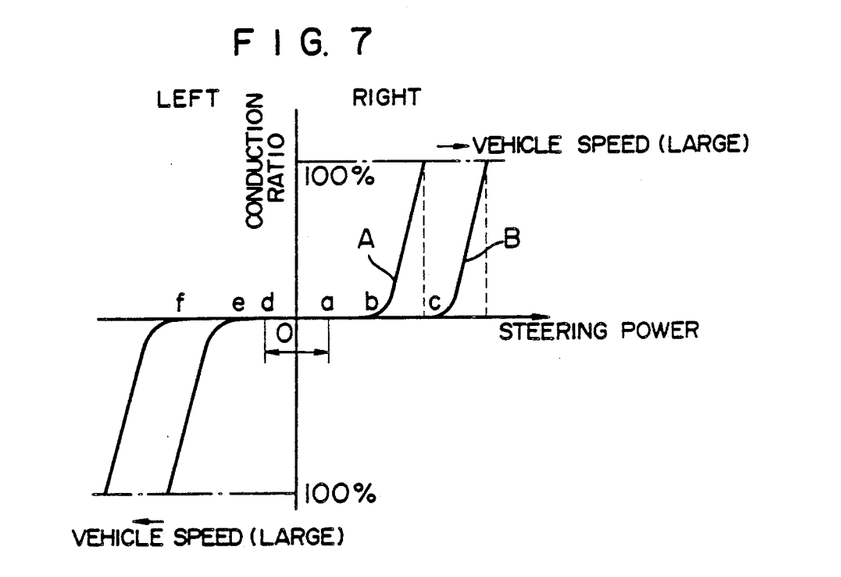
FIG. 7 is a characteristic diagram showing the relationship between the steering power and the conduction ratio as related to the vehicle speed.

In FIG. 6, the torque sensor 6 is connected with a conduction ratio (duty cycle) processing circuit 101, a neutral position detection circuit 102, and a deceleration processing circuit 103. This conduction ratio processing circuit 101 is so constructed to be supplied with the vehicle speed value from the vehicle speed sensor 113, and is connected to an assisting stability change-over circuit 104. The conduction ratio of current applied to the motor for assisting in steering power is determined by the conduction ratio processing circuit 101. The relationship between the conduction ratio of the current applied to the motor for assisting in steering power and the steering power by the steering wheel is shown in FIG. 7. Specifically, the position (+) side on the X axis of the diagram represents the rightward steering power, and the negative (−) side on the X axis thereof the leftward steering power. The conduction ratio for the right and left steering power are the same in magnitude but having different signs. The range up to point a (about 500 g) is called a "neutral region" where the driver merely places his hands on the steering wheel. When the steering power proceeds to increase from point a and exceed point b (about 1.0 kg), the assisting power begins to be applied. In other words, the conduction ratio undergoes a change from 0% up to 100%. At the point of maximum conduction ratio (100%), the steering power reaches about 2.0 kg. When the vehicle speed exceeds 10 km/h, the conduction ratio characteristic shifts in such a direction as to increase the steering power. When the vehicle speed reaches 80 km/h, for instance, the steering power begins to be assisted with the steering power (about 2.5 kg) at point C (conduction ratio 0%), and the conduction ratio reaches 100% with the steering power of about 3.0 kg.

A stability change-over circuit 104 is supplied with an output signal from the neutral position detection circuit 102 and an output signal from a stability conduction ratio setting circuit 114 on the one hand and is connected with a PID controller 105 on the other hand. This stability conduction ratio setting circuit 114 is for setting a conduction ratio that gives such a stability as to reduce the steering angle to ±0 automatically, that is, for self-centering. The conduction ratio thus set is determined by output signals from the steering sensor 10 and the vehicle speed sensor 113.

The PID controller 105, on the other hand, is connected with an assist-brake change-over circuit 106 and the deceleration processing circuit 103, which in turn is supplied with an output signal from the steering angle sensor 10. The assist-brake change-over circuit 106 is connected with a chopper circuit 107 through an adder. The chopper circuit 107 is connected with the motor 7 and a VDS comparator 108, the result of comparison by which is applied to the adder. Also, the output of the VDS comparator 108 provides a command signal to a clutch 8 coupling the motor 7 and the tire 5.

The motor 7 is provided with a rotational speed detector 109. The detected value of the speed detector 109 is applied to an acceleration processing circuit 110 and a rotational speed comparator 112. The acceleration processing circuit 110 is connected with a gain processing circuit 111, and the output of the speed comparator 112 is applied to the clutch 8 and the adder.

The conduction ratio processing circuit 101, the neutral position detection circuit 102, the deceleration processing circuit 103, the stability change-over circuit 104, the PID controller 105, assist-brake change-over circuit 106, VDS comparator 108, acceleration processing circuit 110, gain processing circuit 111, engine speed comparator 112, and the stability conduction ratio setting circuit 114 are constructed in a microcomputer 100.

Now, explanation will be made of the operation.

Upon operation of the steering wheel 1 by the driver and the resulting application of torque to the steering wheel shaft 2, the operation thereof is detected by the torque sensor 6 in accordance with the characteristic of FIG. 2 and a torque signal $\tau$ is produced.

This torque signal $\tau$ represents the steering power corresponding to a voltage value. This steering power is applied to the conduction ratio processing circuit 101, the deceleration processing circuit 103 and the neutral position detection circuit 102. The deceleration processing circuit 103 controls the assist-brake change-over circuit 106 by virtue of the outputs $\tau$ and $\theta$ of the torque sensor 6 and the steering angle sensor 10 in a manner that the circuit 106 decelerates the motor 7 on the basis of a deceleration map in the circuit 103 when the circuit 103 decides to be in a brake mode. The conduction ratio processing circuit 101 determines the conduction ratio $\alpha_n$ shown in FIG. 7 from the steering power and the vehicle speed value applied thereto from the vehicle speed sensor 113, which conduction ratio is applied to the stability change-over circuit 104. The stability change-over circuit 104 controls the motor current so as to return the steering wheel 1 to a straight ahead direction of the steering angle, i.e. neutral direction, when the steering power is zero.

The neutral position detection circuit 102 decides whether the steering power produced from the torque sensor 6 is included within the neutral region, and if so, applies a signal to the stability change-over circuit 104.

Figure 8:
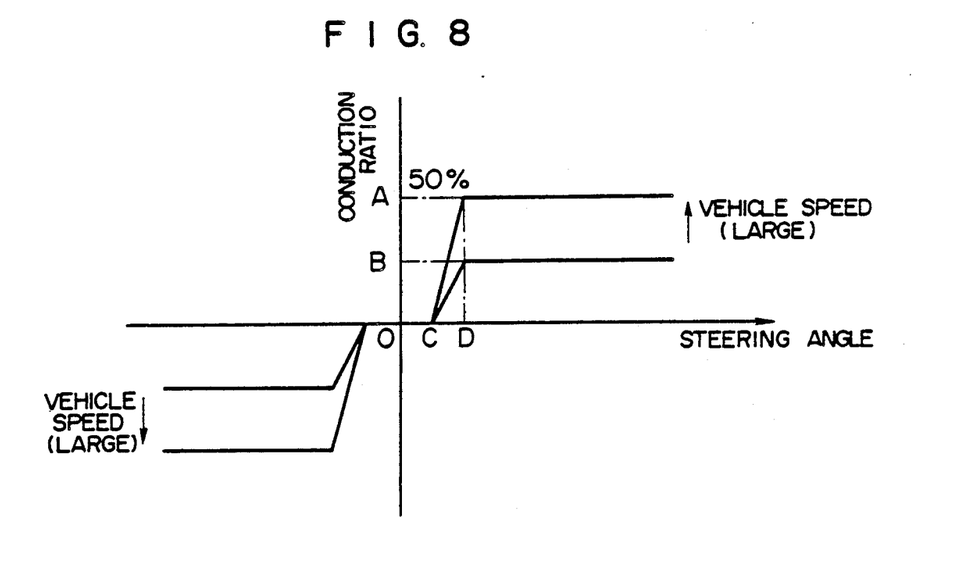
FIG. 8 is a diagram showing the relationship between the magnitude of the steering angle and the conduction ratio as related to the vehicle speed.

In the stability conduction ratio setting circuit 114, a conduction ratio is set from the characteristic diagram shown in FIG. 8 on the basis of the outputs from the steering angle sensor 10 and the vehicle speed sensor 113, and is applied to the stability change-over circuit 104. In FIG. 8, the range from 0 to C represents a dead zone corresponding to about 3⁰ in steering wheel angle (about 0.125⁰ for steering angle). Also, the point D indicates the steering wheel angle of 360° (15° in steering angle). This stability change-over circuit 104 applies the output from the stability conduction ratio setting circuit 114 to the PID controller 105 as a conduction ratio only upon production of an output from the neutral position detection circuit 102, that is, only upon detection of a neutral position. In the case where neutral position detection circuit 102 fails to produce an output, on the other hand, the output from the conduction ratio processing circuit 101 is applied to the PID controller 105. Thus conduction ratio processing circuit 101 determines the voltage to be applied to the motor in accordance with the function of the conduction ratio with respect to the steering power as shown in FIG. 7. The PID controller 105 is a proportional plus integration controller and controls the conduction ratio by the gain produced from the gain processing circuit 111. In this respect the PID controller 105, multiplies a proportional element by a difference between the conduction ratio from the circuit 101 and the acceleration/deceleration value of the speed of the motor delivered from the circuit 111 and integrates the multiplied value. The value produced from this PID controller 105 is applied to the assist-brake change-over circuit 106 for producing an assist or a brake signal selectively in response to an output signal from the deceleration processing circuit 103. The deceleration processing circuit 103 determines the assist or brake mode from the change of the torque value signal produced from the torque sensor 6 and the rate of change of the steering angle, which angle is produced from the steering angle sensor 10, and applies an output thereof to the assist-brake change-over circuit 106. Namely, the circuit 103 changes the control mode of the motor into a deceleration control thereby changing from the assist mode into the brake mode when the direction of the torque detected by the torque sensor becomes different from the direction of the steering angle detected by the steering angle sensor, i.e. when the direction of the torque is left and the direction of the steering angle is right, for example.

Figure 9:
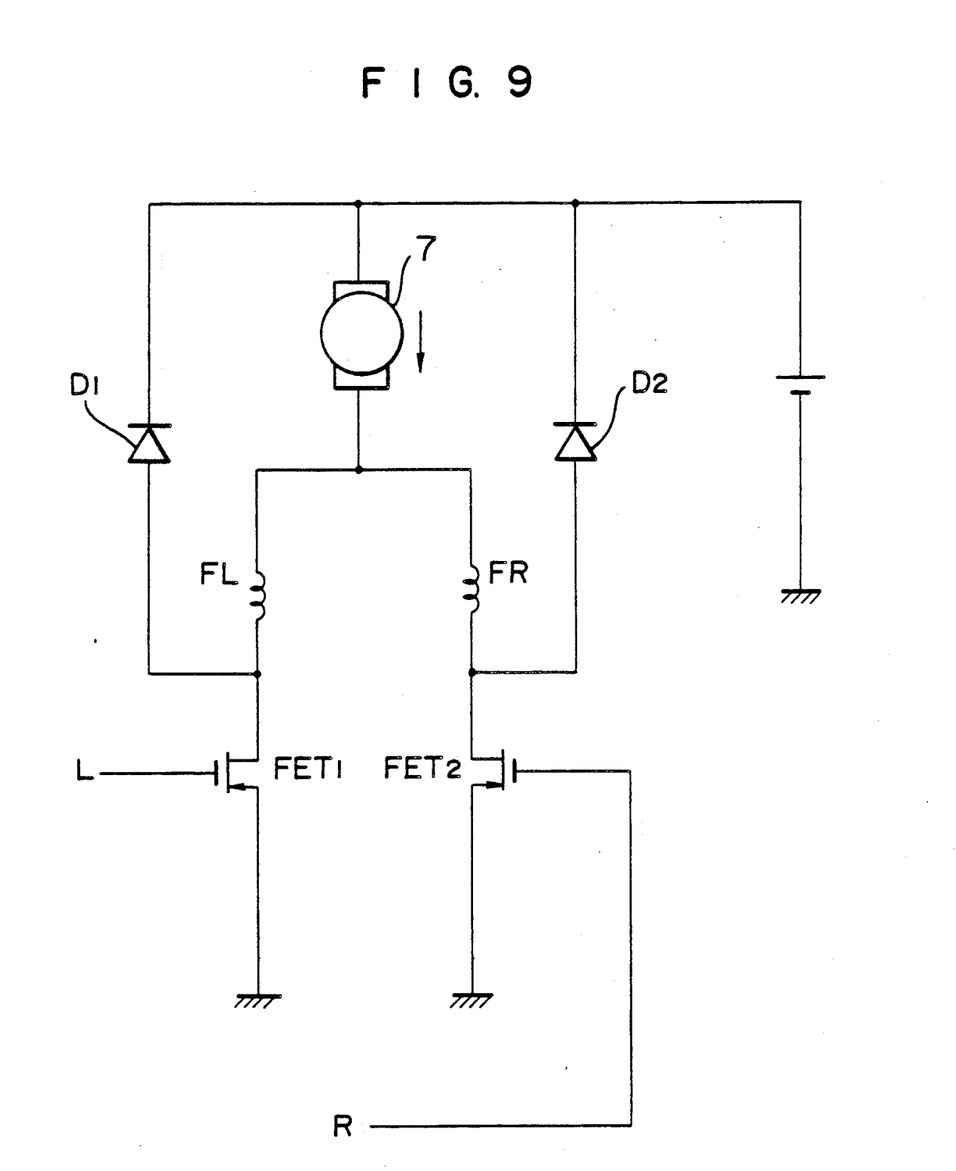
FIG. 9 shows a detailed circuit of the motor and the chopper circuit in FIG. 6.

A signal based on the conduction ratio thus set is applied to the FET1 or FET2 of the chopper circuit 107 shown in FIG. 9, and a chopping current is supplied to the motor 7. The chopper circuit 107 shown in FIG. 9 includes two field effect transistors FET1, FET2 (hereinafter referred to simply as FET1, FET2 respectively) and free wheel diodes D1, D2. FET1 is supplied with a signal representing the logic product of a leftward rotation signal L and a clock pulse signal OP, and FET2 with a signal representing the logic product of a rightward rotational signal R and a clock pulse signal OP. As a result, when the rightward rotational signal R appears, that is, when the torque signal $\tau$ is positive, FET2 is turned on thereby to supply the motor 7 with a current along the direction of the arrow in FIG. 9. The magnitude of this current is controlled by the duty cycle of the pulse signal OP. Also, when the torque signal $\tau$ is negative and the leftward rotational signal L appears, FET1 is turned on, so that the motor 7 is supplied with a along the direction opposite to the arrow in FIG. 9. The current value involved is controlled by the duty cycle of the pulse signal OP.

The polarity of the torque signal is generated from the torque sensor 6 is positive against the torque appearing upon rightward (clockwise) rotation of the steering wheel 1, and negative against the torque caused upon leftward (counterclockwise) rotation thereof. As long as the torque signal $\tau$ is positive, therefore, the car deflects rightward and vice versa.

In both of these cases, the magnitude of the current flowing in the motor 7 is detected by detection of the drain-source voltage VDS of the FETs 1 and 2. This current is compared with a set voltage at the VDS comparator 108, and supplied to the chopper circuit 107 as a feedback signal. As a result, a feedback loop is formed enabling current corresponding to the signal supplied from the assist-brake change-over circuit 106 to be accurately applied to the motor 7.

The diodes D1, D2 have a function to provide a return path with the FET1 and FET2 respectively for chopper-control and are turned off by the pulse signal OP.

When the driver operates the steering wheel 1, therefore, the current of a predetermined value associated with the direction and magnitude of the steering power (operating power) applied is supplied to the motor 7 from a predetermined direction, whereby the torque generated by the motor 7 is applied by the pinion 9 to the rack 4 to provide an auxiliary steering power, thus providing the function of a power steering apparatus.

Figure 10:
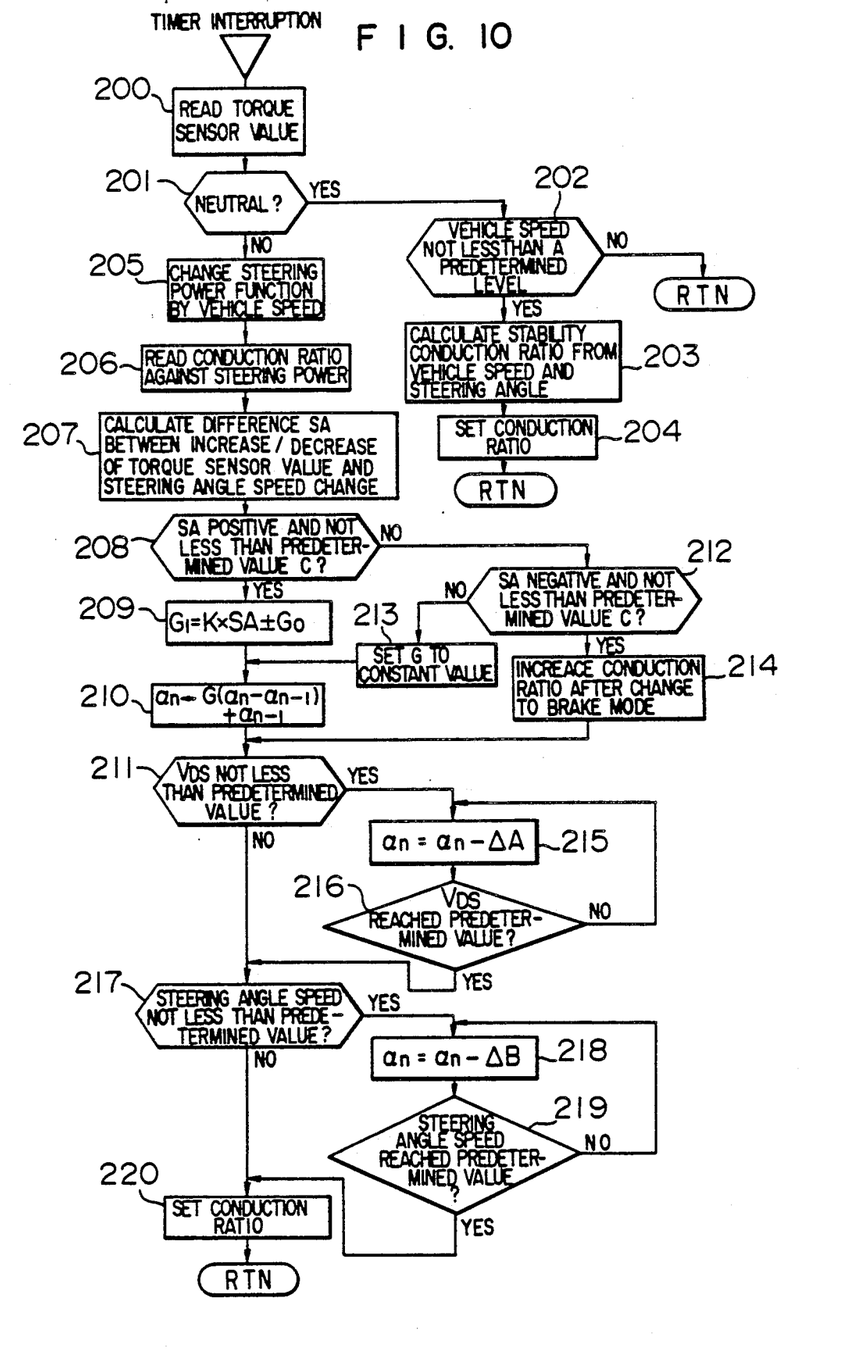
FIG. 10 is an operation flowchart for the circuit of FIG. 6.

FIG. 10 shows an operation flowchart for the control system 11. Specifically, in step 200 a detection value from the torque sensor 6 is fetched, and in step 201 it is decided whether this detection value is within the neutral region defined in FIG. 7 (whether or not the value is about 500 g or less) through the neutral position detection circuit 106. If in step 201 it is decided that the detected torque value is included in the neutral region, in step 202 it is decided whether or not the vehicle speed received from the vehicle speed sensor 113 is more than a predetermined value (10 km/h). If in step 202 it is decided that the vehicle speed is smaller than the predetermined value, the flow ends. If in step 202 it is decided that the vehicle speed is not less than the predetermined value, in contrast, in step 203 the conduction ratio of the self-centering motor in calculated by the stability conduction ratio setting circuit 105 from the outputs of the vehicle speed sensor 113 and the steering angle sensor 10 on the basis of the characteristic diagram shown in FIG. 8. The conduction ratio thus determined is produced at step 204 as a conduction ratio of the motor 7.

In the case where in step 201 it is decided that the value received from the torque sensor 6 is not included in the neutral region, on the other hand, at step 205 the steering power function based on the vehicle speed received from the vehicle speed sensor 113 is changed by the conduction ratio processing circuit 101 in accordance with the characteristic shown in FIG. 7. When at step 205 the steering power function based on the vehicle speed was changed, at step 206 the conduction ratio ($a_n$) corresponding to the steering power is read out on the basis of the characteristic diagram Of FIG. 7. After reading the conduction ratio at step 206, in step 207 the difference SA between the increase or decrease, i.e. change, of the detected value by the torque sensor 6 nd the changing speed of the steering angle is calculated. The increase or decrease of the torque sensor voltage (the detection value by the torque sensor 6) is determined by comparing the preceding and present detected values thereof in a predetermined unit of time. Also, the changing speed of the steering angle is determined from the difference between the preceding and present speeds in said predetermined unit of time, which speeds are converted into voltage terms. The increased or decreased value of the torque sensor output value is required to correspond to the changing speed of the steering angle in the ratio of 1 to 1. Whenever there occurs a difference SA between these two values. therefore, at step 208 it is decided whether or not the difference SA takes a positive value not less than a predetermined level C. The predetermined value C is associated with a value equivalent to the follow-up delay required to assist the steering power, that is, the power applied to the steering wheel by the driver when turning the steering wheel. At step 208 it is detected whether a sudden acceleration (abrupt operation of the steering wheel) was made or not.

If at step 208 it is decided that the difference SA is positive and more than the predetermined value C, at step 209 the gain is determined from the equation below.

$$G = K \times SA + Go \ (K: Constant; \ Go: Original \ gain)$$

Once the gain G is determined at step 209, at step 110 a conduction ratio $a_n$ is renewed by the following equation on the basis of the conduction ratio determined from step 206.

$$a_n = G(a_n - a_{n-1}) + a_{n-1}$$

Then the process proceeds to step 211.

If at step 208 it is decided that the difference SA between the change in value of the torque sensor output value and the changing speed of steering angle is positive but less than the predetermined value C, at step 212 it is decided whether or not the difference SA takes a negative value not less than the predetermined level C. If at step 212 it is decided that the difference is negative but less than the predetermined level C, at step 213 the conduction ratio for step 210 is calculated with the gain G set to the predetermined value Go. If it is determined at step 212 that the difference SA is negative and not less than the predetermined level C, by contrast, at step 214 the assist-brake changeover circuit 106 shown in FIG. 6 is changed into "brake" mode, and by thus increasing the conduction ratio $a_n$, the process proceeds to step 211.

In step 211 it is decided whether or not the detected drain-source voltage VDS of the FETs is not less than a predetermined value. If at step 211 it is decided that VDS is less than the predetermined value, the process proceeds to step 217, while if the decision is that VDS is not less than the predetermined value, step 215 follows. At step 215 the conduction ratio $a_n$ is reduced by the minor conduction ratio A as shown below.

$$a_n = a_n - A$$

Figure 11A:
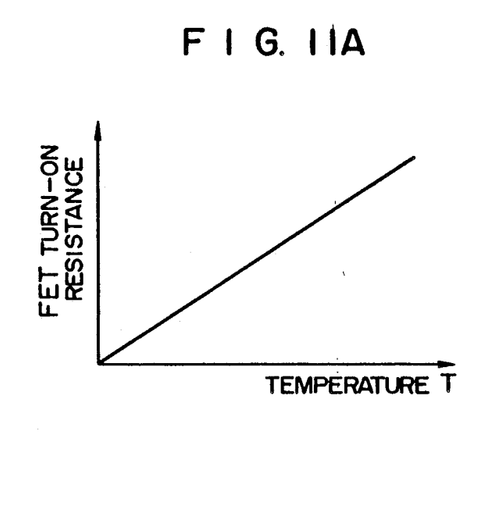
FIG. 11(A) is a diagram showing the characteristics of the temperature and the source-drain resistance of FET shown in FIG. 9.
Figure 11B:
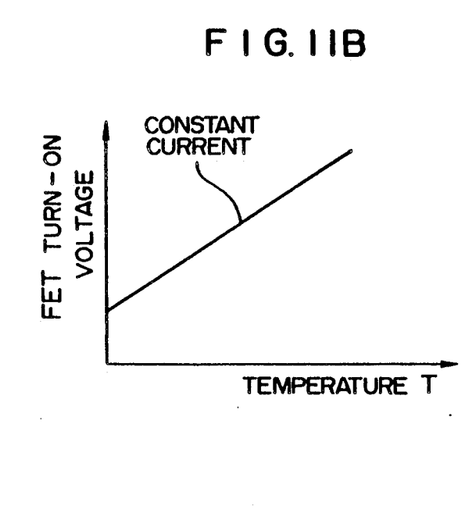
FIG. 11(B) is a characteristic diagram showing the relationship between the temperature and the turn-on voltage of the FET.
Figure 11C:
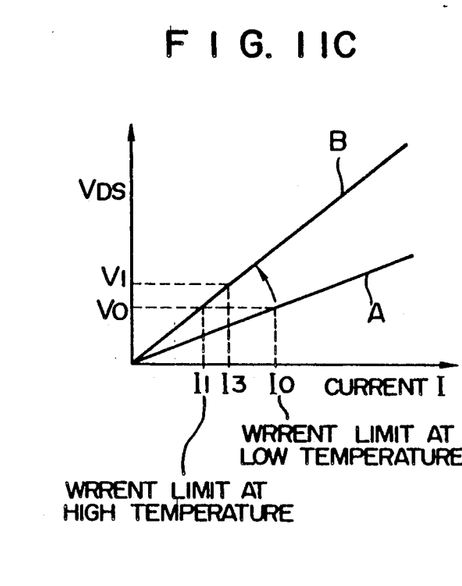
FIG. 11(C) is a diagram showing the characteristics of the drain-source voltage and current of the FET.

This is in view of the fact that in the case where the drain-source voltage VDS is higher than a set value in FIG. 11(C), indicating that there is an excessive current. it is necessary to reduce the conduction ratio to limit the current until VDS reaches the set value.

Now, explanation will be made about the characteristic diagram of FIG. 11.

The current is supplied to the armature of the motor 7 by being chopped by two FETs, right and left, as shown in FIG. 9. The value of the current thus supplied to the motor 7 is determined by the conduction ratio of the chopper circuit 107. The turn-on resistance of the FETs increases in proportion to the temperature as shown in FIG. 11(A). If the turn-on current of the FETs is kept constant, on the other hand, the turn-on voltage of the FETs increases in proportion to the temperature as shown in FIG. 11(B). By watching the drain-source voltage of the FETs, that is, the turn-on voltage of the FETs, therefore, the circuit is protected from a surge current. Specifically as shown in FIG. 11(C), the straight line A represents the relationship between the drain-source voltage VDS of the FETs and the armature current of the motor 7 with the junction temperature at 25° C, and the straight line B a similar relationship with the junction temperature of 100° C. Assume that the set value of VDS in the VDS comparator 108 shown in FIG. 6 if $V_O$. If the junction temperature is 25° C. (straight line A), the current $I_O$ can be applied. With the increase in junction temperature, however, the current that can be applied decreases until 100° C. (straight line B) where only a maximum of $I_1$ can be applied. By controlling the drain-source voltage VDS of the FETs to a set value, therefore, it is possible to reduce the current proportionately with the increase in temperature, thus preventing a surge current.

Figure 12:
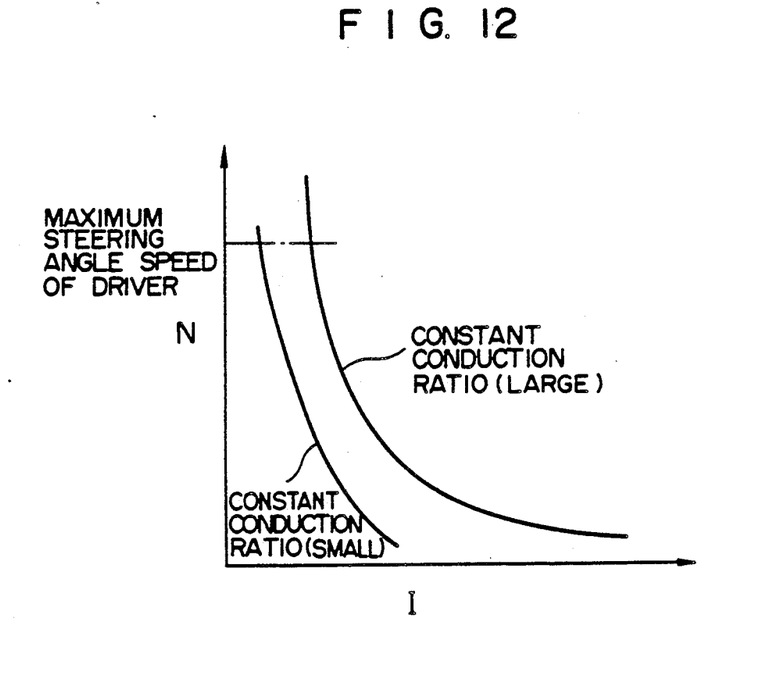
FIG. 12 is a diagram showing the speed-current characteristic with the conduction ratio kept constant.

At step 216 it is decided whether or not the voltage VDS has reached a predetermined value (set value), and if it has not been reached, the process is returned to step 215 while if the predetermined value is reached, the process proceeds to step 217. At step 217 it is decided whether the changing speed of the steering angle of the steering wheel is constant. Along the curve associated with a constant conduction ratio, the motor speed decreases with the decrease in current value as shown in FIG. 12. Specifically, the changing speed of the steering angle of the steering wheel, which is dependent on the speed of the motor 7, increases in proportion to the motor speed. If the changing speed of the steering angle of the steering wheel is to be kept constant, therefore, it is necessary to reduce the speed of the motor 7. Since the motor speed is proportional to the armature current, on the other hand, it is possible to decrease the motor speed by decreasing the conduction ratio. As a result, when it is decided that the changing speed of the steering angle of the steering wheel is not less than a predetermined value at step 217, at step 218 the conduction ratio $\alpha_n$ is decreased by the minor conduction ratio $\Delta B$ as shown by the equation below.

$$\alpha_n = \alpha_n - \Delta B$$

This reduction of the conduction ratio $\alpha_n$ is repeated at step 219 until the steering angle speed reaches a fixed value, followed by step 220. If at step 217 it is decided that the steering angle speed is less than the predetermined value, by contrast, the process proceeds to step 220, where the conduction ratio $\alpha_n$ is set.

It will thus be understood from the foregoing description that according to the present invention, the changing speed of the steering angle of the steering wheel can be followed with satisfactory feel.

We claim:

1. An electrically-operated power steering apparatus comprising:

steering power detecting means for detecting a steering power applied to a steering wheel and to produce an output signal indicative thereof;

means for controlling a motor in accordance with a predetermined function of the steering power detected by said steering power detecting means;

steering angle detecting means for detecting a steering angle of said steering wheel and for producing a signal indicative thereof; and means for modifying a conduction ratio of a current applied to said motor in accordance with a comparison between a change of the output signal of said steering power detecting means in a predetermined interval of time and a rate of change of the signal from said steering angle detecting means in said predetermined interval of time.

2. An electrically-operated power steering apparatus for controlling rotating power of a motor in accordance with a predetermined function of the steering power applied to a steering wheel thereby to apply an auxiliary steering power from the motor to the steering wheel, including a torque sensor for detecting through a steering shaft said steering power applied to said steering wheel as a torque signal;

a steering angle sensor for detecting a steering angle of a road wheel and for producing a signal indicative thereof;

processing means for effecting a comparison between a rate of change of the signal from said steering angle sensor and a change of the torque signal delivered from said torque sensor;

conduction ratio processing means for determining a conduction ratio based on at least a value obtained form the steering power delivered from said torque sensor;

means for determining a control mode for said motor based on the outputs from said conduction ratio processing means and said processing means; and chopper means controlled in accordance with the determined control mode by said determining means thereby to control said motor, whereby said motor is controlled in accordance with the conduction ratio based on the comparison between the change of the torque signal delivered from said torque sensor in a predetermined interval of time and the rate of change of signal from said steering angle sensor in said predetermined interval of time.

3. An apparatus as claimed in claim 2, wherein said chopper means comprises chopping FETs and a duty cycle of the chopper means is controlled by the conduction ratio to keep the drain-source voltage of said FETs at a predetermined set level.

4. An electrically-operated power steering apparatus as claimed in claim 3, wherein said conduction ratio processing means determines said conduction ratio based on the output signals from said torque sensor and a vehicle speed sensor for detecting a vehicle speed.

5. An electrically-operated power steering apparatus as claimed in claim 4, wherein between said conduction ratio processing means and said determining means there are connected assisting stability change-over means for providing a signal when detecting a neutral position of the steering wheel to self centre said steering wheel and a PID controller for performing control by proportional plus integration in accordance with the output from said change-over means.

* * * * *